(12) United States Patent
Rheker

(10) Patent No.: US 8,974,226 B2
(45) Date of Patent: Mar. 10, 2015

(54) METHOD AND APPARATUS FOR OPERATING A FURNACE

(75) Inventor: Frank Rheker, Dusseldorf (DE)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 14/007,906

(22) PCT Filed: Mar. 27, 2012

(86) PCT No.: PCT/EP2012/055443
§ 371 (c)(1),
(2), (4) Date: Sep. 26, 2013

(87) PCT Pub. No.: WO2012/130858
PCT Pub. Date: Oct. 4, 2012

(65) Prior Publication Data
US 2014/0017619 A1 Jan. 16, 2014

(30) Foreign Application Priority Data
Mar. 28, 2011 (DE) .......................... 10 2011 015 317

(51) Int. Cl.
*F23G 5/14* (2006.01)
*F23C 6/02* (2006.01)
*F23G 5/12* (2006.01)
(Continued)

(52) U.S. Cl.
CPC ... *F23G 5/14* (2013.01); *F23C 6/02* (2013.01); *F23G 5/12* (2013.01); *F23G 5/20* (2013.01); *F23G 5/442* (2013.01); *F23G 7/12* (2013.01); *F23L 7/007* (2013.01); *F27B 7/36* (2013.01); *F27D 99/0033* (2013.01); *F23L 9/00* (2013.01); *F23C 2900/06041* (2013.01);
(Continued)

(58) Field of Classification Search
USPC ............... 431/10, 181, 8, 187, 188, 351, 354; 110/346, 182.5
See application file for complete search history.

(56) References Cited

U.S. PATENT DOCUMENTS 5,587,283 A 12/1996 Karinthi et al.
8,007,681 B2 * 8/2011 Farmayan et al. ....... 252/186.24

FOREIGN PATENT DOCUMENTS

EP 0 866 295 9/1998
EP 1 065 461 1/2001

OTHER PUBLICATIONS

International Search Report for PCT/EP2012/055443, mailed Jul. 10, 2012.

*Primary Examiner* — Alfred Basichas
(74) *Attorney, Agent, or Firm* — Christopher J. Cronin

(57) ABSTRACT

The present invention relates to a method for operating combustion process in a furnace whereby a primary fuel and a secondary fuel are burnt, to an apparatus for injecting liquid oxygen into the furnace and also to the corresponding furnace. The method comprises at least the following steps:
the primary fuel and a primary oxidizer are injected into the furnace to create a primary combustion zone,
liquid oxygen is injected in as secondary oxidizer such that the secondary fuel combusts with the secondary oxidizer thereby creating a distinct secondary combustion zone.
The invention makes it possible for a secondary fuel having a significantly lower calorific value than the primary fuel to be burnt completely in the furnace, such that a product to be produced in the furnace has an improved quality.

8 Claims, 2 Drawing Sheets

(51) Int. Cl.
*F23G 5/20* (2006.01)
*F23G 5/44* (2006.01)
*F23G 7/12* (2006.01)
*F23L 7/00* (2006.01)
*F27B 7/36* (2006.01)
*F27D 99/00* (2010.01)
*F23L 9/00* (2006.01)

(52) U.S. Cl.
CPC ............... *F23C 2900/07021* (2013.01); *F23G 2900/50007* (2013.01); *Y02E 20/344* (2013.01)
USPC ................. 431/10; 431/8; 431/181; 431/354

METHOD AND APPARATUS FOR OPERATING A FURNACE

CROSS REFERENCE TO RELATED APPLICATIONS

This application is a §371 of International PCT Application PCT/EP2012/055443, filed Mar. 27, 2012, which claims §119(a) foreign priority to German patent application 102011015317.9, filed Mar. 28, 2011, both of which are herein incorporated by reference in their entireties.

TECHNICAL FIELD OF THE INVENTION

The present invention relates to a method for operating a combustion process in a furnace and to an apparatus and furnace therefor. The present invention relates in particular to those methods and furnaces in which both primary fuels and secondary fuels combust with primary and secondary oxidizers.

BACKGROUND

Combustion furnaces are widely used. In said furnaces, heat is generated by the combustion of one or more fuels with an appropriate oxidizer.

Such combustion furnaces are generally operated with air as oxidizer. It is also known to use oxygen-enriched air or oxygen as oxidizer in combustion furnaces.

U.S. Pat. No. 5,587,283 describes a combustion process using oxygen as oxidizer. According to said process, a single combustible gas, such as natural gas, and oxygen are injected via a burner, 15 to 35% of the total oxygen being injected as a coherent jet in the liquid phase. The process is said to be suitable for use in metal melting furnaces, enamel furnaces and glass furnaces. By injecting the liquefied oxygen as a coherent jet at high velocity, said oxygen passes through the high temperature region for the downstream combustion of the remainder of the gaseous fuel. An elongation of the flame is obtained which is adjustable as a function of the proportion of liquefied gas injected.

A further combustion process in which liquid oxygen is used is described in EP-A-0866295. EP-A-0866295 discloses more specifically a method in which preheated mineral feed material is charged into a rotary kiln and thermally processed by a flame produced by combustion of a single unidentified fuel with an oxygen containing gas, and whereby at least one jet of liquid oxygen is injected into the kiln, in particular beneath the flame, so that the oxygen impacts the mineral feed material in liquid form. The liquid oxygen then accompanies the charge material as it tumbles down inside the rotary kiln towards the flame.

Combustion furnaces are generally preferably operated with highly flammable fuels such as natural gas and fuel oil, but some processes make use of or require the combustion of low grade fuels or combustibles of low flammability, including waste products.

For example, for the production of cement in a rotary tubular kiln, it is known to generate a flame with a conventional high calorific value fuel. The temperature of said flame can be increased by supplying additional oxidizer, for example oxygen-enriched air, on top of the hot coolant air coming from the clinker cooler.

In order to keep the costs for fuel low, it has become an established practice to add an inexpensive secondary fuel to the primary fuel. The calorific value of the secondary fuel is lower than the calorific value of the primary fuel and the secondary fuel burns in the flame of the primary fuel. In particular, use is sometimes made of plastics waste as the secondary fuel. This plastics waste is injected into the rotary tubular kiln as shredded particles such that it burns as completely as possible in the flame of the primary fuel. The secondary fuel therefore comprises constituents which do not all have the same geometry.

It has been discovered that not all the constituents of the secondary fuel burn completely. Instead, the secondary fuel constituents which are not completely burnt generate soot particles, and impair the quality of the cement which is to be produced. In addition, incomplete combustion can lead to the formation of carbon monoxide, which where possible should not pass into the environment.

EP-B-1 065 461 discloses a calcination process adapted to enable the combustion of such a low-calorific-value secondary fuel. In said process, the mineral material to be calcined is heated by means of a flame comprising a primary combustion zone and a downstream secondary combustion zone. The primary combustion zone is created by the combustion of a primary fuel with a first oxidizer and is located near the points of injection of the first oxidizer and of the primary fuel. The flame further comprises a secondary combustion zone located downstream of the primary zone and created by the combustion of a secondary fuel with a secondary oxidizer, the secondary fuel being preheated by flowing through the primary zone of the flame before entering the secondary combustion zone. The secondary fuel typically has a low calorific value of $15 \times 10^6$ J/kg or less. The first oxidizer has an oxygen content of more than 21% and up to substantially 100%. The primary oxidizer may have a temperature of about 100° C. The secondary oxidizer is preferably air and in particular air coming from the clinker cooler and having a temperature of between 500° C. and 1000° C. Both oxidizers are therefore used in gaseous form.

SUMMARY OF THE INVENTION

It is an object of the present invention to provide an optimized method for operating a combustion furnace with a primary and a secondary fuel, whereby said secondary fuel may be a low-grade fuel.

It is a further aim of the present invention to alleviate at least some of the disadvantages known from the prior art for heating such a combustion furnace and in particular such a a rotary tubular kiln. In particular, it is an object of the present invention to provide an improved method enabling the complete combustion of the secondary fuel.

These objects are achieved by a method according to claim 1 and by a furnace according to claim 11. Furthermore, an apparatus suitable for injecting liquid oxygen into a furnace, in particular for carrying out the method according to the invention is defined in claim 8. Further advantageous configurations of the method, apparatus and furnace are indicated in the dependent claims. The features given individually in the claims can be combined with one another in any desired, technologically meaningful manner, and can be supplemented with explanatory information from the description and drawings, presenting further embodiments of the invention.

The present invention relates to a method for operating a combustion process in a furnace whereby a primary fuel and a secondary fuel are burnt. The method of the invention comprises at least the following steps:

the primary fuel and a primary oxidizer are injected into the furnace to create a primary combustion zone in which the primary fuel burns with the primary oxidizer, and liquid oxygen is injected in as a secondary oxidizer such that the combustion of the secondary fuel with the secondary oxidizer creates a secondary combustion zone distinct from the primary combustion zone.

In the present context, two combustion zones are considered to be distinct when they do not occupy the same space within the furnace.

According to one embodiment, the secondary fuel is also injected into the furnace. In that case, the secondary fuel is preferably injected into the furnace so that the secondary fuel enters the primary combustion zone before it enters the secondary combustion zone.

According to an alternative embodiment, the secondary fuel is fed to the furnace together with a charge to be heated by the combustion process, for example in order to melt or calcine the charge or in order to remove combustible matter from the charge.

In certain cases, the secondary fuel may already be present in the furnace prior to the combustion process, for example in the form of deposits on the internal structure of the furnace (such as furnace walls). This is more particularly the case when the purpose of the combustion process is to remove said secondary fuel/deposits by combustion from the internal structure of the furnace, in particular for the maintenance or renovation of the furnace.

The furnace is advantageously a rotary furnace, such as a rotary kiln for producing cement.

Generally speaking, if the furnace contains a charge to be heated, there is preferably no impact of the secondary oxidizer in liquid form onto said charge.

As primary fuel, it is preferable to use a high grade fuel, and in particular a combustible gas mixture, e.g. natural gas, liquid gas, biogas, acetylene and/or propane, combustible liquid mixtures and/or solid fuels, e.g. hard coal and/or brown coal.

When the secondary fuel is fed to the furnace, such as by injection or with the charge, it is beneficial to use as secondary fuel combustible substances which have a calorific value which is lower than the calorific value of the primary fuels and which, in particular, are available more readily and/or more cost-effectively. It is particularly preferable to use waste products, in particular plastics waste, as the secondary fuel.

As primary oxidizer, one may use air, oxygen-enriched air or a gas having an oxygen content of more than 98% by volume. For the selection of the primary oxidizer, factors such as costs, availability and environmental constraints are typically taken into account. When the invention is operated in a pre-existing furnace equipped for a given gaseous oxidizer, it may be advisable to continue to use said oxidizer as the primary oxidizer in accordance with the invention.

Within the context of the present invention, "primary combustion zone" is to be understood to mean the zone in which the primary fuel undergoes an exothermic reaction with the primary oxidizer during operation. The primary combustion zone can therefore be determined in particular by only injecting the primary fuel and the primary oxidizer (and no secondary oxidizer) into the furnace, and determining the zone of the exothermic reaction, i.e. in particular in a state in which no secondary fuel and no secondary oxidizer is injected into the furnace. The primary combustion zone can also approximately be determined in the presence of both the primary and secondary fuel (as is the case during the operation of the process), by injecting only the primary oxidizer (but not secondary oxidizer) and by determining the zone of the exothermic reaction generated by the primary oxidizer (in the absence of the secondary oxidizer). This approach is more particularly useful when it is not possible to operate the furnace without the secondary fuel without substantially modifying the location or volume of the primary combustion zone, for example when, during the operation of the process the primary fuel and the secondary fuel are injected into the furnace as a single mixture of a high-grade and a low-grade fuel.

According to an embodiment of the invention, the secondary fuel is advantageously conveyed into the furnace in such a way that it is at least temporarily located in or adjacent the primary combustion zone, i.e. in the zone in which the primary fuel undergoes an exothermic reaction with the primary oxidizer. In this manner, the secondary fuel is heated before it enters the secondary combustion zone and combusts with the secondary oxidizer. If the secondary fuel is temporarily located in the primary combustion zone, the secondary fuel may also already partially react with the primary oxidizer if a sufficiently high temperature is reached and if the primary oxidizer is present in a sufficient quantity thereto.

On account of the settable momenta of the primary fuel and of the primary oxidizer, the primary combustion zone is usually in the form of a substantially horizontal flame, whereas, when the secondary fuel is injected into the furnace, the settable discharge momentum and the drag coefficients generally mean that the secondary zone describes a substantially ballistic path.

In order to convey the secondary fuel into and through the primary combustion zone, the secondary fuel is preferably injected into the furnace in a direction parallel to the primary fuel or the primary oxidizer. In this context, it is particularly preferable for the secondary fuel to be surrounded by the primary fuel as it is being injected into the furnace. Alternatively, the secondary fuel can be injected into the furnace above the primary fuel, such that the secondary fuel passes through the primary combustion zone on account of the force of gravity. According to a further preferable embodiment, the secondary fuel is injected into the furnace below the primary fuel, but with a vertically upwardly directed velocity component, such that the secondary fuel enters the primary combustion zone from below. In that case, the secondary fuel may then leave the primary combustion zone still travelling upwards and thereafter travel back downwards through the primary combustion zone before reaching the secondary combustion zone. Typically, for low-grade secondary fuels, the conditions (nature of the fuel, temperature, residence time, oxygen concentration, etc.) are such that complete combustion of the secondary fuel in the primary combustion zone is not possible.

If the secondary fuel does not travel through the primary combustion zone or, when the secondary fuel does travel through the primary combustion zone and not all of the constituents of the secondary fuel combust in the primary combustion zone, the present invention provides for liquid oxygen to be injected into the furnace as the secondary oxidizer to enable combustion or further combustion of the secondary fuel. In particular, it is provided that liquid oxygen, often abbreviated to LOX, is injected in through (the flame of) the primary combustion zone.

According to the invention, the aim is for the liquid oxygen to be injected into the furnace in such a way that oxygen is available for reaction with the secondary fuel outside the primary combustion zone. More specifically, gaseous oxygen produced by evaporation of the injected liquid oxygen is available for said reaction.

Within the context of the present invention, "secondary combustion zone" is therefore to be understood to mean the zone outside the primary combustion zone in which the secondary fuel undergoes an exothermic reaction with the secondary oxidizer. By injecting liquid oxygen into the furnace in accordance with the invention, the zone in which the secondary fuel undergoes an exothermic reaction is therefore generated or increased, as a result of which combustion or more complete combustion of the secondary fuel takes place and the formation of soot particles is avoided.

It is particularly preferable for the liquid oxygen to be injected into the furnace as a continuous jet. Particularly in the case of confined spatial conditions, much more oxygen (in terms of mass or molecules) can be supplied to the furnace in liquid form than in gaseous state.

It is preferable that the secondary fuel is injected into the furnace in the part of the furnace in which the primary fuel and the primary oxidizer, and optionally also the secondary fuel, are injected too. As a consequence, the liquid oxygen also enters the primary combustion zone, and this in turn has the effect that at least some of the liquid oxygen evaporates and undergoes an exothermic reaction with the primary fuel and/or the secondary fuel. In the primary combustion zone, it is therefore possible for the evaporated part of the liquid oxygen to undergo an exothermic reaction with the primary fuel and optionally with the secondary fuel. In a specific embodiment of the invention, the secondary fuel is injected into the furnace in the vicinity of the liquid oxygen in such a way that at any point in time, the liquid oxygen or the evaporated liquid oxygen is in the vicinity of the secondary fuel and thus promotes the exothermic reaction of the secondary fuel, including in the primary combustion zone when both the liquid oxygen and the secondary fuel travel through the primary combustion zone. The primary fuel, the secondary fuel, the primary oxidizer and the secondary oxidizer are then preferably injected into the furnace together from a common part of the furnace on an outlet side of the furnace and counter to the direction in which the feed material is conveyed through the furnace.

The non-evaporated part of the liquid oxygen or the evaporated part of the liquid oxygen which has not undergone an exothermic reaction with either the primary fuel or the secondary fuel in the primary combustion zone is therefore available outside the primary combustion zone as a reaction partner for the combustion of secondary fuel. If the secondary fuel has traveled through the primary combustion zone, said part of the liquid oxygen is available as a reaction partner for the combustion of the part of the secondary fuel which has been heated in the primary combustion zone, but was not burnt therein.

It is particularly preferable that the secondary fuel and the secondary oxidizer flow in a substantially parallel manner through the primary combustion zone, in which case they preferably flow through the primary combustion zone at a small distance of at most 50 cm [centimeters], or even at most 20 cm, from one another. This makes it possible for oxygen to be available to the secondary fuel as an oxidation partner at any point in time on the path through the furnace.

Alternatively, it can be advantageous for the secondary oxidizer to be injected in a direction counter to the direction of travel of the secondary fuel. This means that the liquid oxygen is injected in from the side of the furnace which lies opposite the point at which the secondary fuel is injected in the furnace, such that secondary oxidizer is made available for the combustion of secondary fuel outside the primary combustion zone.

Furthermore, it is preferable that the secondary combustion zone adjoins the primary combustion zone. This means that the secondary combustion zone is directly adjacent to the primary combustion zone, as a result of which the oxidation of the secondary fuel which is started in the primary combustion zone is continued in the secondary combustion zone. The primary and the secondary combustion zone then form one coherent overall combustion zone. Particularly effective combustion of the secondary fuel is achieved as a result.

The secondary fuel cost-effectively comprises constituents of plastic and/or other combustible solids, in particular constituents with differing geometries. Particularly in the case of greatly varying geometries of the secondary fuels to be burned, not all of the constituents of the secondary fuel can burn in the primary combustion zone. According to the invention, the particularly large constituents or those which burn with particular difficulty are also burnt in the furnace.

It is also preferable if the secondary fuel has a calorific value of less than or equal to $15 \times 10^6$ J/kg [Joules per kilogramme], in particular less than $10 \times 10^6$ J/kg or even less than $5 \times 10^6$ J/kg. The method according to the invention leads to effective combustion even in the case of fuels having such a very low calorific value.

The secondary fuel may in particular comprise solid constituents, the greatest dimension of which is from 0.5 cm to 20 cm, such as planar plastics waste. Planar plastics waste is to be understood to mean in particular shredded plastic films or plastic containers such as plastic bottles. In the case of this type of plastics waste, the size of the various waste constituents varies greatly. The latter can be burned particularly readily and completely by the method according to the invention. Alternative fuels comprising different constituents, in particular waste substances, often also referred to as fluff, can thereby be admixed more readily and utilized better and to a larger extent, for example in the order of magnitude of 1 to 10 t/h (tonnes per hour).

In accordance with a further aspect of the invention, an apparatus for injecting liquid oxygen into the furnace is proposed. The apparatus comprises a lance and a line for guiding the liquid oxygen to the lance. The lance has (1) a central feed, which has a first inlet opening, and (2) a coolant guide, which surrounds the feed and has a second inlet opening, the line for guiding the liquid oxygen being connected to the first inlet opening and to the second inlet opening.

The line therefore connects a storage tank or other source of liquid oxygen and the lance. The feed guides the liquid oxygen from the inlet opening to an outlet opening, which issues into the furnace when the apparatus is installed. The coolant guide surrounds the feed and therefore forms a gap between the outer surface of the feed and the inner surface of the coolant guide, in which gap it is possible to guide liquid oxygen and/or gaseous oxygen.

It is preferable that a valve is used to guide some of the liquid oxygen guided in the line to the first inlet opening and the rest of the liquid oxygen to the second inlet opening. The proportion of liquid oxygen which is supplied to the coolant guide serves to cool the feed, in the course of which this proportion may be heated and may be present in gaseous form. The coolant guide and the liquid oxygen or gaseous oxygen located therein therefore serve to insulate and cool the feed in which the liquid oxygen is guided into the furnace. It is therefore possible using just one line both to supply the lance with liquid oxygen and to cool the liquid oxygen in the lance or keep it cold.

In an advantageous development of the apparatus, the coolant guide has an outlet opening, which is arranged radially on the coolant guide (away from the feed outlet). This has the effect that liquid oxygen and/or already evaporated liquid oxygen enters the coolant guide through the second inlet opening, where it cools the feed or keeps it cold, and exits the outlet opening as evaporated oxygen, i.e. in gaseous form, from where it can be conducted to further applications.

Alternatively, it is proposed that the coolant feed may have a discharge opening, which surrounds the oxidizer feed. In this embodiment, liquid or evaporated oxygen enters the coolant guide through the second inlet opening, where it cools the feed and if appropriate evaporates further. Then, the evaporated oxygen exits the coolant guide, and thereby forms an enclosing sheath for the liquid oxygen leaving the feed (via the feed outlet). A jet of liquid oxygen which is surrounded by gaseous oxygen is formed as a result. All of the oxygen supplied to the lance is therefore available to the combustion process in the furnace.

In accordance with yet another aspect of the invention, a furnace is proposed, comprising the apparatus according to the invention. Said furnace comprises a primary fuel feed, a primary oxidizer feed and optionally also a secondary fuel feed (when the secondary fuel is injected separately into the furnace). The furnace is preferably designed to carry out the method according to the invention. The furnace may in particular be a rotary tubular kiln for producing cement.

One development of the furnace is characterized in that the lance of the apparatus and the secondary fuel feed are oriented parallel to one another. The liquid oxygen and the secondary fuel are then injected into the furnace in parallel, as a result of which the oxygen is available to the secondary fuel for exothermic reaction throughout its path through the furnace.

In accordance with a further development, the lance is arranged above the primary fuel feed, as a result of which, during operation, the liquid oxygen enters the furnace above the primary combustion zone and flows through said furnace in a downward direction, i.e. from top to bottom, preferably in close vicinity to the secondary fuel.

According to an expedient embodiment of the furnace, the lance and the primary fuel feed include an angle of 5° to 20°. If the lance is arranged above the primary fuel feed, the liquid oxygen is injected into the primary combustion zone in with a downwards velocity component, whereas if the lance is arranged below the primary fuel feed, the liquid oxygen is injected into the primary combustion zone with an upwards velocity component. This makes it possible for the liquid oxygen and, optionally also the secondary fuel, to enter the primary combustion zone from below, and to therefore reside therein for a particularly long time.

The present invention also relates to the use of the apparatus or of the furnace as disclosed herein in the method of the invention.

The details and advantages which are disclosed for the method according to the invention can be transferred and applied to the apparatus and the furnace according to the invention, and vice versa.

BRIEF DESCRIPTION OF THE DRAWINGS

The invention and the technical field will be explained in more detail below on the basis of the drawings. The drawings show particularly preferred exemplary embodiments, to which the invention is however not restricted. It should be pointed out in particular that the figures, and in particular the illustrated dimensional relationships, are merely schematic. Schematically.

DETAILED DESCRIPTION

Figure 1:
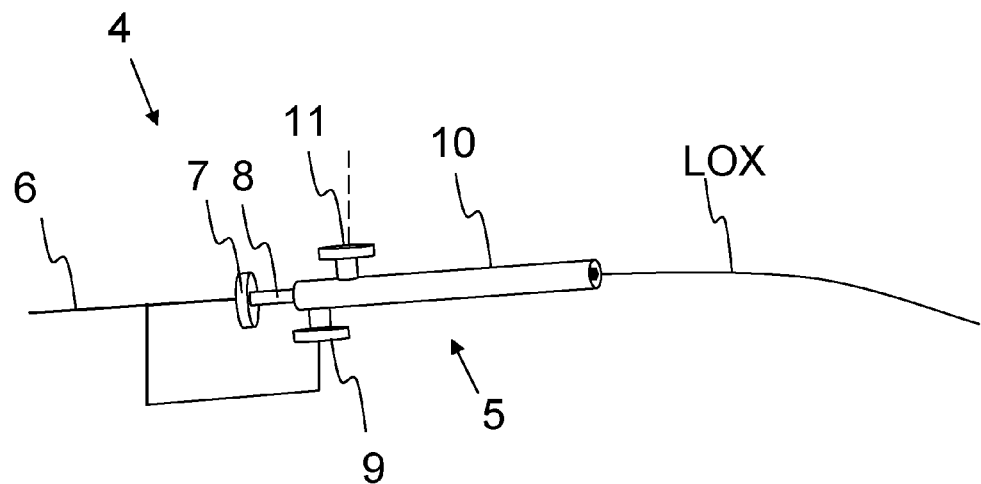
FIG. 1: shows an apparatus according to the invention for injecting in liquid oxygen.

FIG. 1 schematically shows an embodiment of an apparatus 4 according to the invention for injecting liquid oxygen (LOX) into a furnace 1. The apparatus 4 comprises a lance 5 having a feed 8 and a coolant guide 10 which surrounds the feed 8. The feed 8 has a first inlet opening 7. The coolant guide 10 has a second inlet opening 9 and an outlet opening 11. The apparatus 4 further comprises a line 6 for guiding liquid oxygen to the lance 5. The line 6 is connected both to the first inlet opening 7 and to the second inlet opening 9.

During operation, liquid oxygen (LOX) is therefore injected into the feed 8 and on an outlet side of the feed 8, here on the right-hand side of the feed, leaves the feed 8 as a jet of liquid oxygen (LOX). During operation, a quantity of liquid oxygen which is branched off from the line 6 is guided into the coolant guide 10, the oxygen evaporating on the way there or in the coolant guide 10. The oxygen guided in the coolant guide 10 serves for cooling the feed 8 and therefore for keeping the liquid oxygen in the feed 8 in the liquid state. Upon cooling of the feed 8, the liquid oxygen evaporates. The gaseous oxygen leaves the coolant guide 10 through the outlet opening 11 and can be used in further processes or at another location in the furnace 1.

Figure 2:
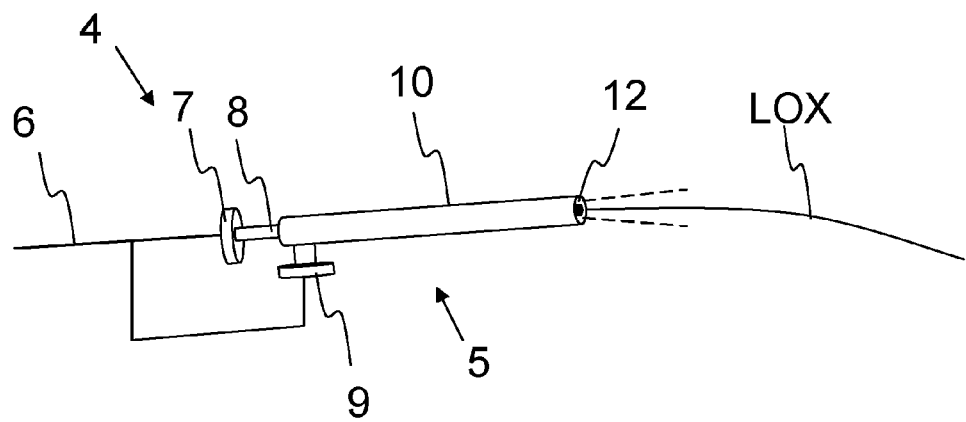
FIG. 2: shows a further embodiment of the apparatus according to the invention.

FIG. 2 shows a further embodiment of the apparatus 4, the following text explaining the differences with respect to the embodiment in FIG. 1. Unlike in FIG. 1, the coolant guide 10 has no outlet opening 11, but instead a discharge opening 12 which surrounds the feed 8. The oxygen which has thus evaporated upon cooling of the feed 8 leaves the lance 5 at the same side as the liquid oxygen (LOX), and forms a layer of oxygen which shrouds the jet of liquid oxygen (LOX).

Figure 3:
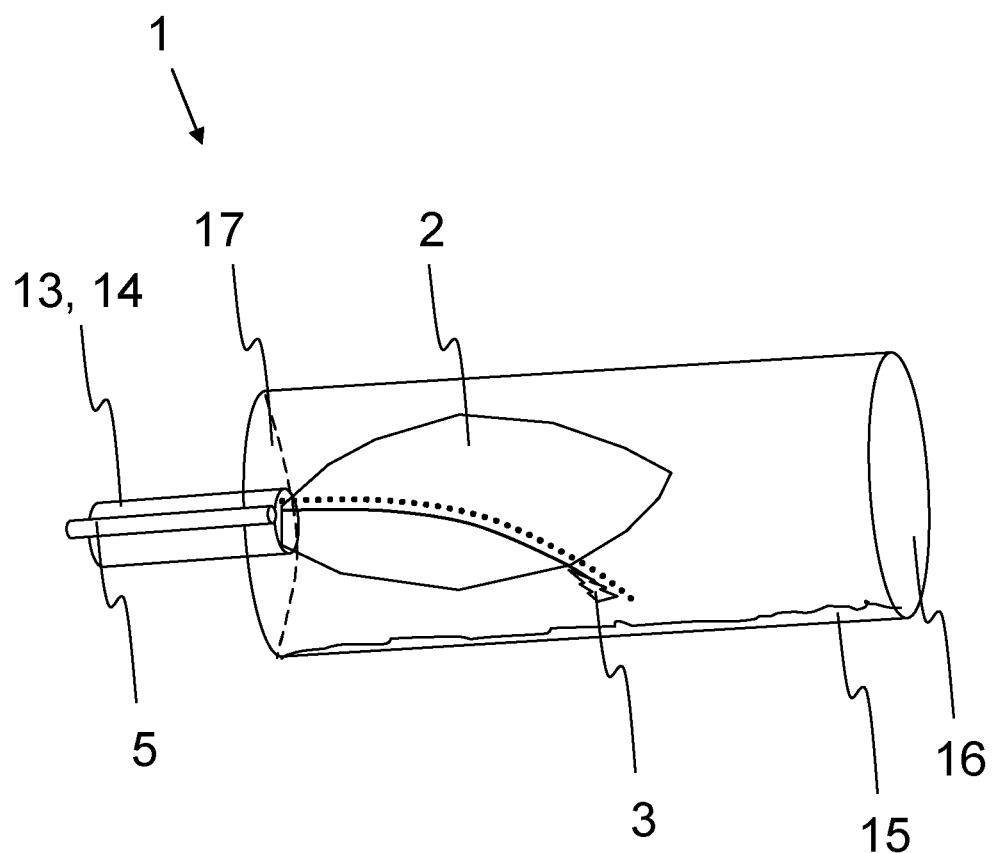
FIG. 3: shows a furnace for producing cement.

FIG. 3 schematically shows a furnace 1 for producing cement, in which the material to be heated is guided from an inlet side 16 to an outlet side 17 in a rotatable furnace. The material to be heated forms a layer of material 15.

The furnace 1 comprises a primary fuel feed 13 and a secondary fuel feed 14 and also a lance 5, as described in FIGS. 1 and 2. Together with the primary fuel, a primary oxidizer is also injected into the furnace 1 through the primary fuel feed 13. An exothermic reaction between the primary fuel and the primary oxidizer forms a primary combustion zone 2. The secondary fuel is injected into the furnace 1 through the secondary fuel feed 14 in such a way that the secondary fuel passes through the primary combustion zone, the path of the secondary fuel being indicated here by a dotted line. A jet of liquid oxygen is provided by the lance 5 (indicated by the solid line) and passes through the primary combustion zone 2 parallel to the secondary fuel. Outside the primary combustion zone 2, the secondary fuel oxidizes with the secondary oxidizer and thus forms a secondary combustion zone 3.

The present invention makes it possible for a secondary fuel having a significantly lower calorific value than the primary fuel to be burned completely in the furnace, such that if a product is produced in the furnace, such as cement, it has an improved quality.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

LIST OF REFERENCE SYMBOLS

1 Furnace
2 Primary combustion zone
3 Secondary combustion zone
4 Apparatus
5 Lance
6 Line
7 First inlet opening
8 Feed
9 Second inlet opening
10 Coolant guide
11 Outlet opening
12 Discharge opening
13 Primary fuel feed
14 Secondary fuel feed
15 Layer of material
16 Inlet side
17 Outlet side
LOX Liquid oxygen

The invention claimed is:

1. A method for operating a combustion process in a furnace whereby a primary fuel and a secondary fuel are burnt, the method comprising the steps of:
    injecting the primary fuel and the primary oxidizer into the furnace so to create a primary combustion zone in which the primary fuel burns with the primary oxidizer, the primary oxidizer being selected from the group consisting of air, oxygen-enriched air, and a gas having an oxygen content of more than 98% by volume; and
    injecting liquid oxygen into the furnace as a secondary oxidizer such that the secondary oxidizer, together with the secondary fuel, creates a secondary combustion zone, which is distinct from the primary combustion zone.

2. The method of claim 1, further comprising the step of injecting the secondary fuel into the furnace, whereby said secondary fuel is injected into the furnace so that the secondary fuel enters into the primary combustion zone.

3. The method of claim 2, wherein the secondary fuel and the secondary oxidizer flow substantially parallel through the primary combustion zone.

4. The method of claim 2, wherein the secondary oxidizer is injected in a direction counter to the secondary fuel.

5. The method of claim 1, wherein the secondary combustion zone adjoins the primary combustion zone.

6. The method of claim 1, wherein the secondary fuel has a calorific value of less than or equal to $15 \times 10^6$ J/kg.

7. The method of claim 1, wherein the secondary fuel comprises solid constituents, the greatest dimension of which is from 0.5 cm to 20 cm.

8. The method of claim 1, wherein the secondary fuel comprises planar plastics waste.

* * * * *